United States Patent [19]

Shartzer

[11] 4,276,010

[45] Jun. 30, 1981

[54] PIPE BELLER WITH FORCE DETERMINED TEMPERATURE

[75] Inventor: Kenneth B. Shartzer, Hurst, Tex.

[73] Assignee: Plastic Machinery Corporation, Fort Worth, Tex.

[21] Appl. No.: 23,154

[22] Filed: Mar. 23, 1979

[51] Int. Cl.³ ............................................. B29D 23/00
[52] U.S. Cl. .................................... 425/143; 425/384; 425/392; 425/403
[58] Field of Search ............... 425/384, 392, 393, 403, 425/DIG. 218, 143

[56] References Cited

U.S. PATENT DOCUMENTS

| 3,806,301 | 4/1974 | Osterhagen | 425/384 X |
| 4,005,968 | 1/1977 | Crawford | 425/392 X |
| 4,008,028 | 2/1977 | Ronden | 425/384 X |

Primary Examiner—Thomas P. Pavelko
Attorney, Agent, or Firm—Wofford, Fails & Zobal

[57] ABSTRACT

A method and apparatus for belling a plastic pipe wherein the pipe is heated until a predetermined force can move the pipe onto a mandrel; the magnitude of the force being such that the pipe is heated to a temperature between its memory temperature and its breakdown temperature.

8 Claims, 13 Drawing Figures

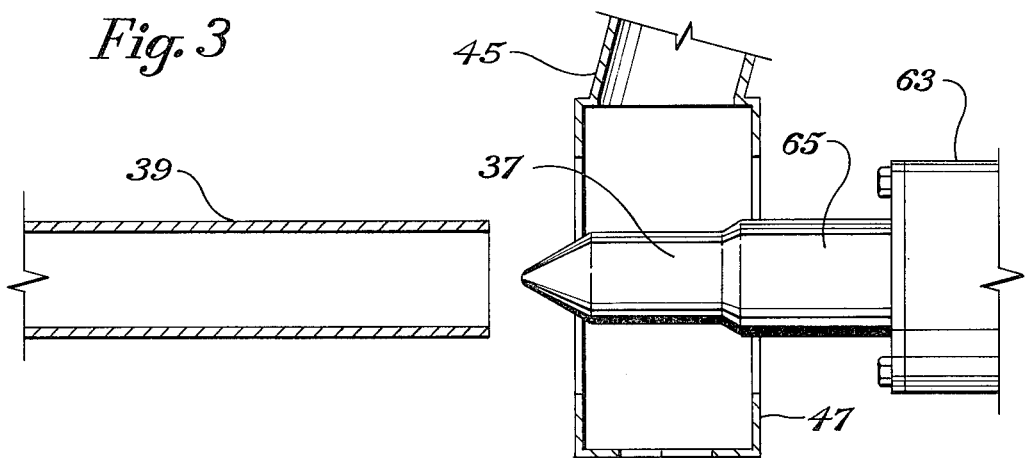
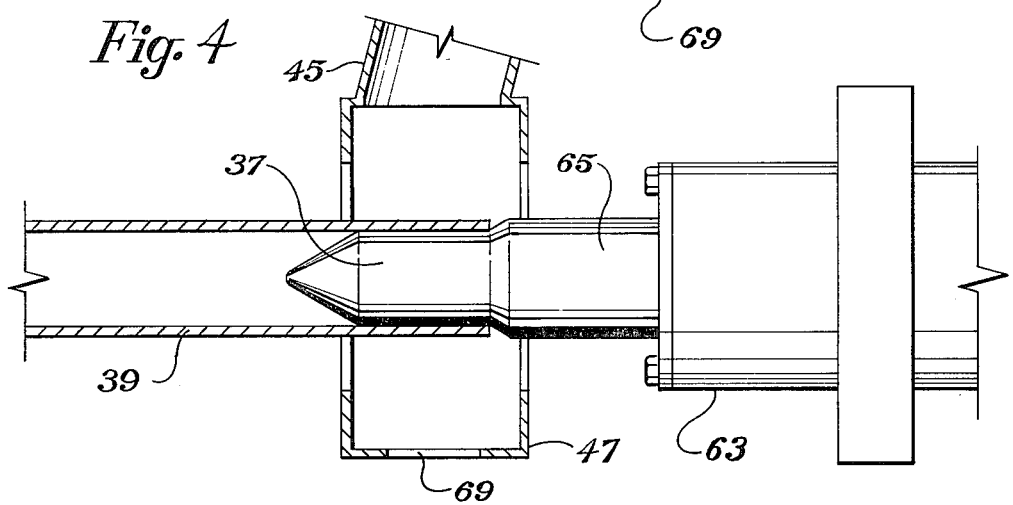
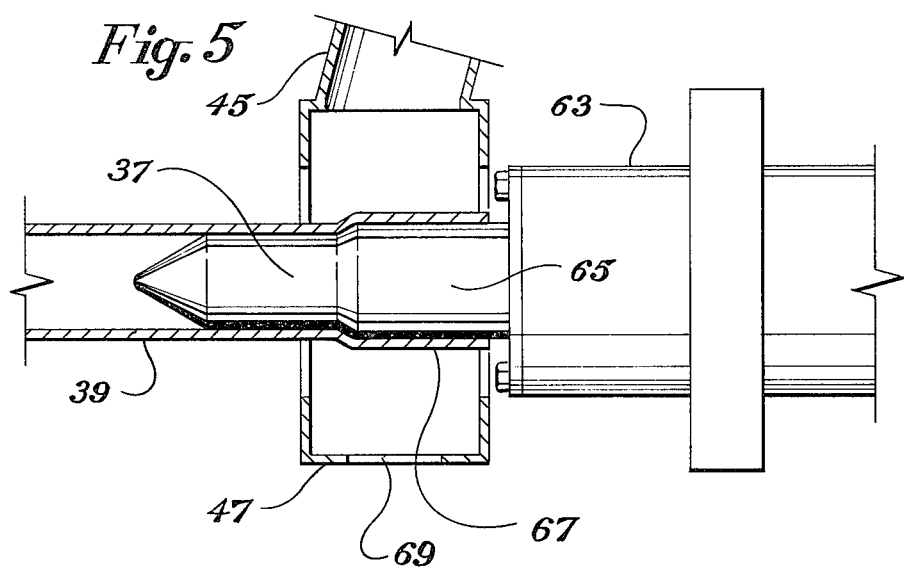

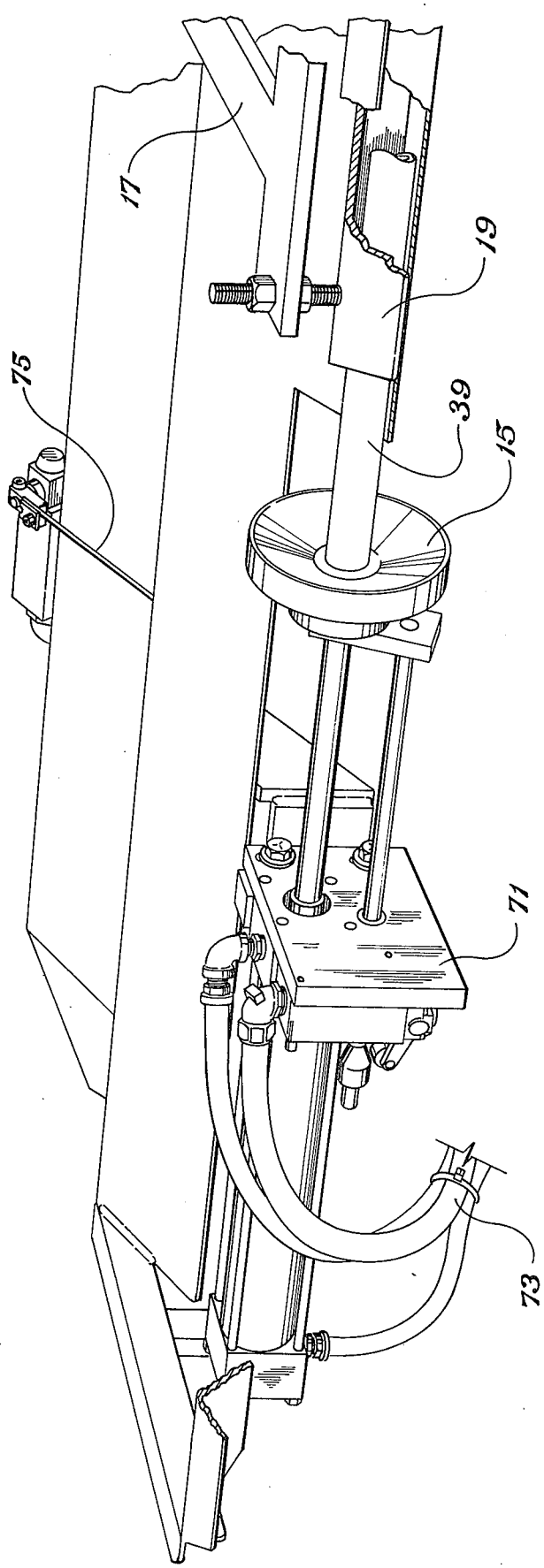

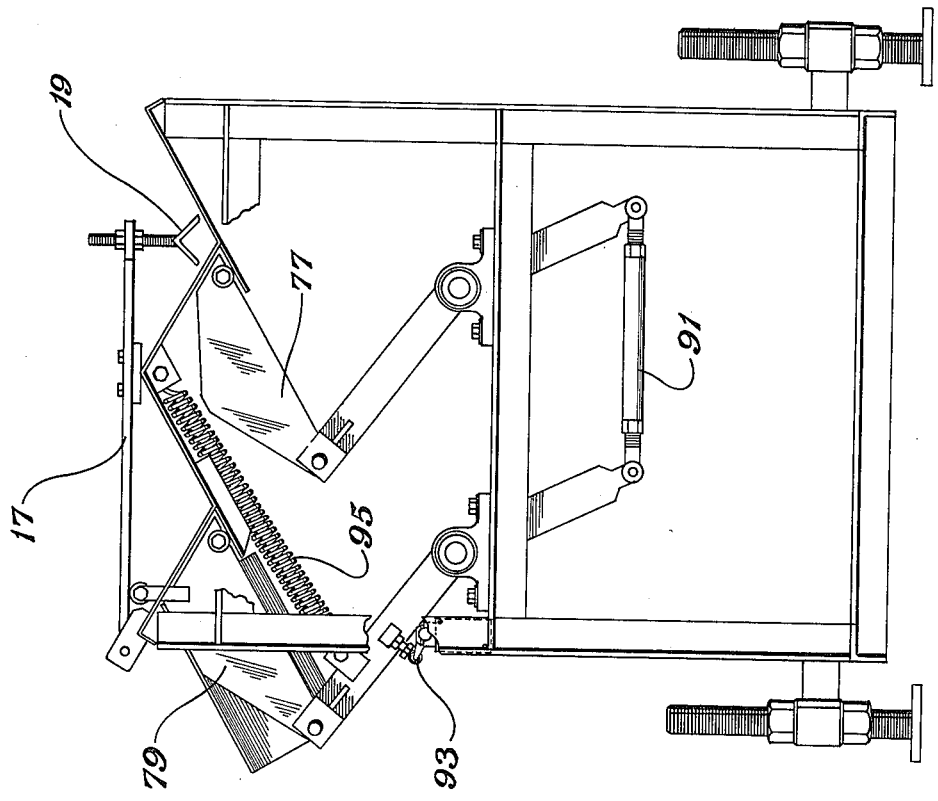
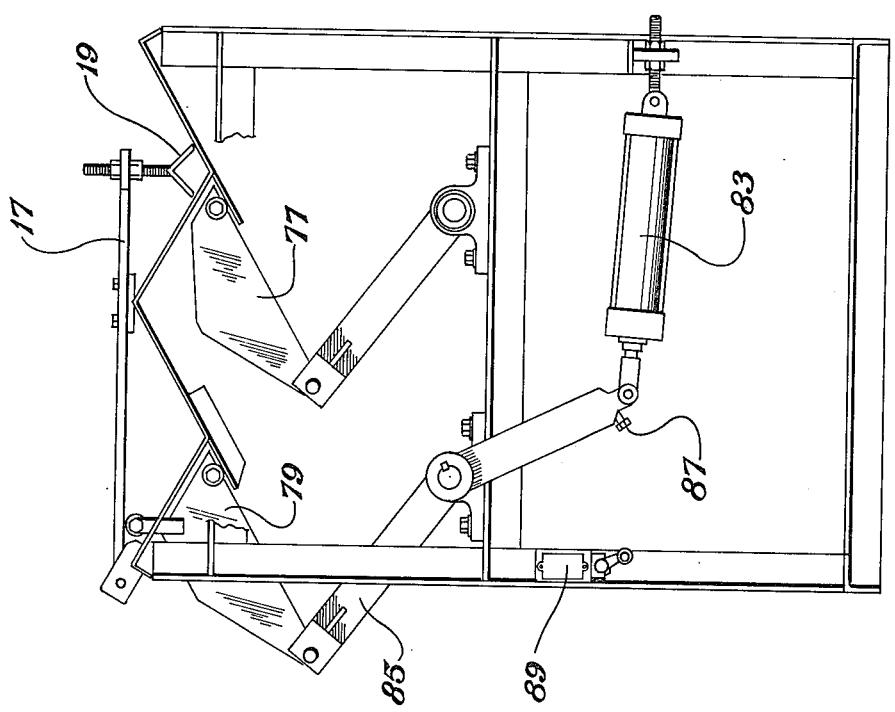

PIPE BELLER WITH FORCE DETERMINED TEMPERATURE

BACKGROUND OF THE INVENTION

1. Field of the Invention

This invention relates to methods and apparatus for belling pipe and more particularly to methods and apparatus for belling plastic pipe.

2. Description of the Prior Art

A particularly convenient way to join one plastic pipe to another is by adhesion, or "glueing". To facilitate this adhesion, one end of the pipe is belled; that is, enlarged just enough to allow an unbelled pipe end to closely fit within the belled section. In order to make a good seal, the belled section must be smooth and uniformly sized to within close tolerances. Further, to prevent breakage upon stress after joining, the belled section must be of a uniform thickness. Finally, these characteristics must be maintained even after storage and handling, so that the plastic in the belled section must be of a proper set or hardness.

In the past, belling has been achieved by heating the ends of the pipe in a furnace or the like for a set period of time, removing them from the furnace, and then forcing the ends over a mandrel. In this manner, the furnace temperature and the period during which the pipes were heated were monitored to achieve the proper pipe temperature for belling. This pipe temperature is crucial since it drastically affects each of the variables mentioned before. For example, if the pipe temperature is not high enough (not beyond its memory temperature) then the set or hardness of the belled plastic will not be enough to prevent its creeping back to its old shape; especially if exposed to sunlight or heat. If the temperature is too high (above its damage or breakdown temperature) the integrity of the plastic is is reduced and it becomes brittle or flaws develop in the surface. Further, if the heating is not uniform throughout the length, circumference, and thickness of the belled section then the above problems can occur in localities or the belling can be off-center. All of these are a problem in the prior art, since the pipe temperature is maintained only by monitoring the surface temperature and the length of time the pipe is in the furnace. These factors can change suddenly if a sudden draft of wind occurs or the removal of the pipe from the furnace is delayed. This is evidenced by a large percentage of defective pipes made in the prior art. These defects can especially be a problem if they are not discovered until they leak or a break occurs after the pipe is installed underground.

SUMMARY OF THE INVENTION

It is accordingly an object of the present invention to provide an improved method and apparatus for belling plastic pipe.

It is a further object to provide an improved method and apparatus for belling plastic pipe which produces a uniform and reliable belled pipe section.

It is yet a further object of the invention to provide a pipe belling method and apparatus which achieves an improved and uniform pipe temperature for belling.

In accordance with the present invention, there is provided a mandrel for belling the pipe. The mandrel is urged into the pipe with a predetermined force. The pipe is then heated. The predetermined force is chosen such that the mandrel does not move into the pipe until the pipe reaches the proper temperature and softness. The pipe is then cooled and removed from the mandrel.

For a further understanding of the invention and further objects, features, and advantages thereof, reference may now be had to the following description taken in conjunction with the accompanying drawings.

BRIEF DESCRIPTION OF THE DRAWINGS

FIG. 3 is a partial side view, partly in section, of the present invention shown prior to belling.

FIG. 4 is a partial side view, partly in section, of the mandrel of the present invention as the pipe is being heated.

FIG. 5 is a partial side view, partly in section, of the mandrel of the present invention after belling has occurred.

FIG. 6 is a partial isometric view of the apparatus at the unbelled end of the pipe.

FIG. 9 is an end view of the pipe table.

FIG. 10 is another end view of the pipe table.

DESCRIPTION OF THE PREFERRED EMBODIMENT

Figure 1:
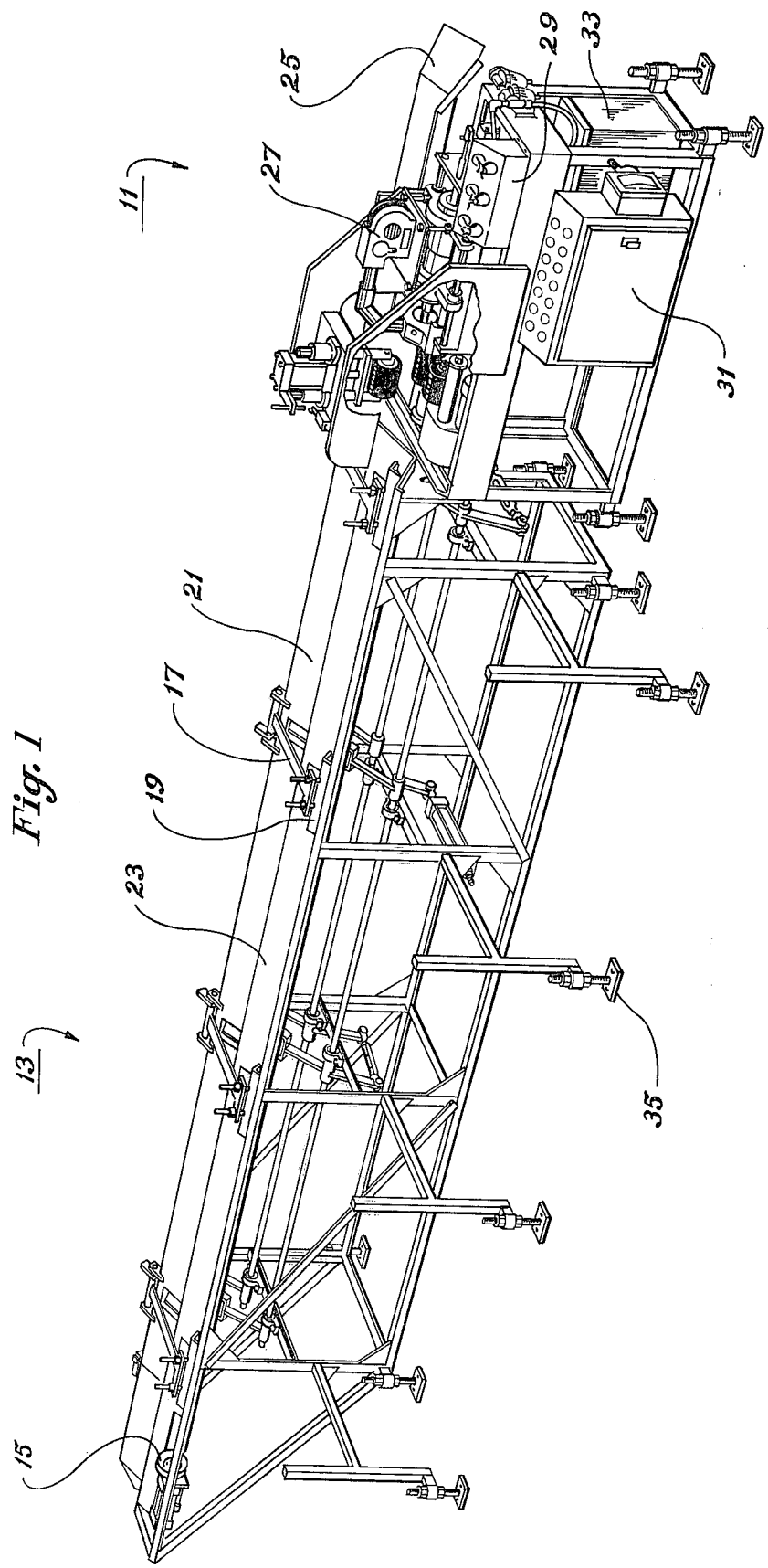
FIG. 1 is a isometric view of the apparatus of the present invention.

Referring to FIG. 1, the invention is shown in a side view, with a general pipe belling, or beller, section 11 and a general pipe transfer section 13. The beller section 11 contains the controls and mechanism for belling the end of the pipe, while the pipe transfer section 13 contains the mechanism for moving the pipe into and out of position for belling. In place for belling, a pipe is positioned at its non-belled end by a positioning plate 15 while a pipe transfer arm such as 17 and a pipe retaining angle such as 19 hold the pipe down during compression. After belling, a new pipe is moved from a transfer trough or vee section 21 to a dump trough or vee section 23 where the new pipe will be belled. As a new pipe is moved to the dump trough 23, a belled pipe is simultaneously moved out of the dump trough 23. When the pipe is in position for belling in trough 23, a heat gun 27 and a mandrel are moved forward to heat and bell the pipe. Subsequently, the pipe is cooled, the mandrel removed, and a new pipe is moved into position as described before. Each of the movements described are automatically performed by pneumatic valves which are controlled through a pneumatic regulator control box 29 and electronic circuits in the electronic control box 31. Water for cooling the belled pipe is held in a cooling water tank 33. Height adjustment feet, such as foot 35, support both the pipe transfer section 13 and the beller section 11 to allow them to be aligned and leveled.

Figure 2:
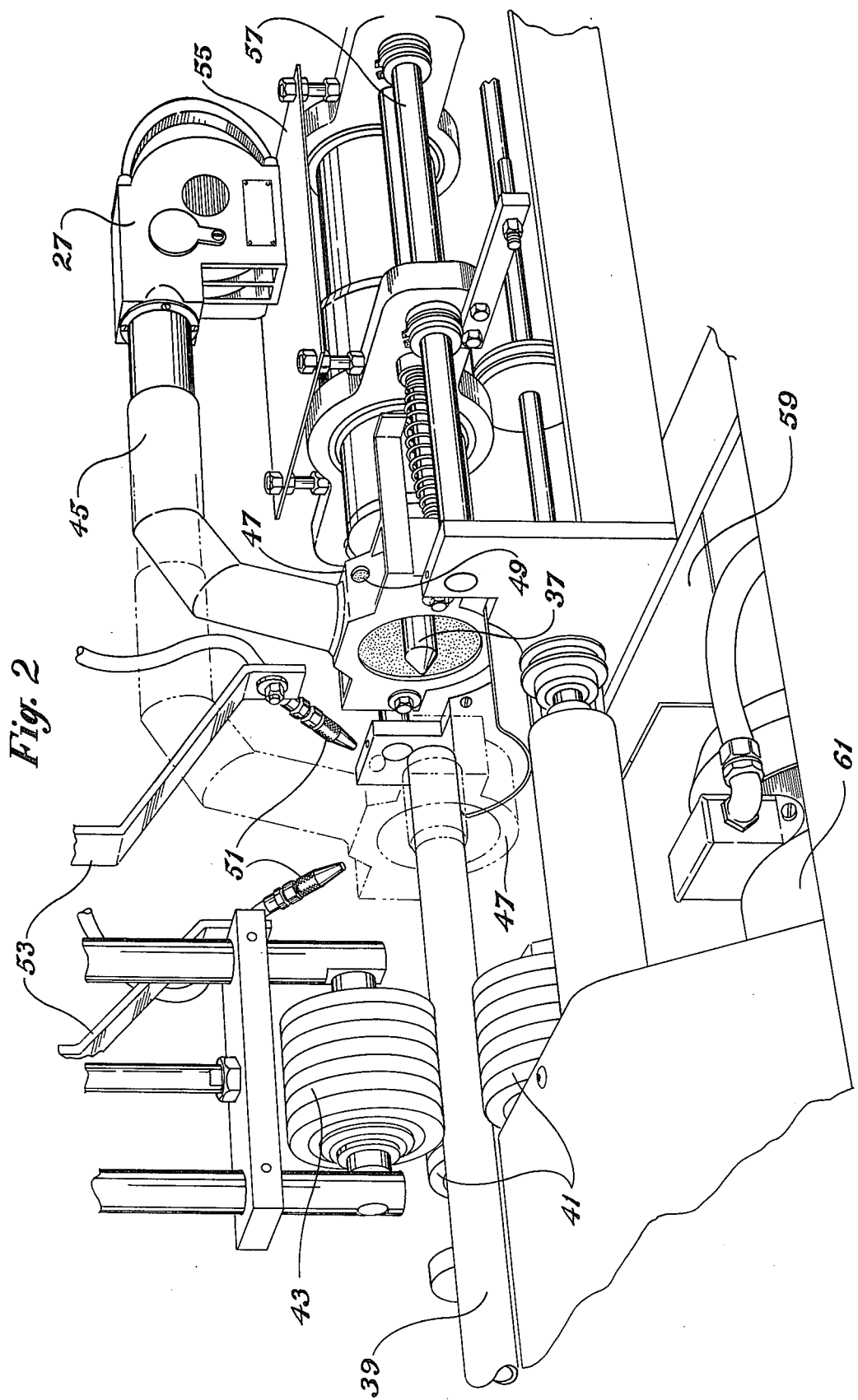
FIG. 2 is a partial isometric view of the mandrel and heating section of the apparatus of the present invention.

Referring now to FIG. 2, the beller section is shown in more detail. The mandrel 37 is the heart of the beller section, shape. While pipe 39 is presently unable to move farther onto mandrel 37, drive drum 63 urges the mandrel toward pipe 39 with a specially predetermined force. When the end of pipe 39 is sufficiently softened by the heating to allow the predetermined force to move the mandrel further into pipe 39, drive drum 63 moves the mandrel forward. Oven 47 does not move forward but remains in its position about the end of pipe 39.

FIG. 5 shows the pipe and mandrel after mandrel 37 has moved forward. The larger end 65 of mandrel 37 has formed a belled section 67 on the end of pipe 39. At this point heating is stopped and cooling water is sprayed into oven 47 to cool the belled section of the pipe. Water exits through the port 69 in the bottom of oven 47. After cooling has occurred, oven 47 and mandrel 37 are retracted to the position shown in FIG. 3. As described before, the belled pipe is then transferred out and a new pipe is moved into position. The process is then repeated.

During belling, the most important aspect to control is the temperature of the pipe as it is belled. If the temperature is too low when belling occurs then the belled shape will not be permanently retained. This feature of plastic is well known and the temperature which must be reached to avoid this problem is known as a memory temperature. It is, therefore, important that during belling the temperature of the plastic be at least its memory temperature. Polyvinylchloride pipes have memory temperatures of approximately 350° F.

If, however, too high a temperature is reached during belling then the plastic can change its physical properties or even its chemical composition. This temperature is herein called the breakdown or damage temperature of the plastic. For polyvinylchloride pipes this temperature is approximately 500° F.

In order to properly heat the section to be belled, to a temperature between its memory temperature and its breakdown temperature, the force at which the mandrel is applied to the pipe is specially selected. The end of pipe 39 is heated until it softens sufficiently to allow the mandrel to move into the pipe. Heating is stopped at this point. Since the softness or plasticity of the pipe depends on its temperature then the predetermined force necessarily determines the temperature of the pipe as it is belled. This method of controlling the pipe temperature is far superior to others since the predetermined force is much easier to control than time of heating or oven temperature.

Many factors must be considered when setting the predetermined force in order to heat to a temperature between the memory temperature and the breakdown temperature. The first is the size and thickness of the pipe. The angle of the conical frustum of the mandrel is another factor. A third factor is whether or not the mandrel is preheated. A typical predetermined force for one inch polyvinylchloride pipe is 60 pounds-force. Of course, it is preferred that the mandrel is preheated, since this produces a more nearly uniform temperature through the wall of the pipe.

FIG. 6 shows the far end of the transfer section. When a pipe is transferred to the dump side trough, positioning plate 15 moves forward to properly position the pipe for belling. Although the pipe is moved forward prior to belling, it is not necessary to retract the pipe for removal after belling since an opening is provided on the dump side to allow free removal. Thus, plate 15 merely operates to push the pipe forward. Plate 15 is moved forward by cylinders 71 which are operated pneumatically through hoses 73. A transfer trough limit switch 75 extends into the transfer trough and signals when movement of a new pipe up the transfer trough should cease.

Figure 7:
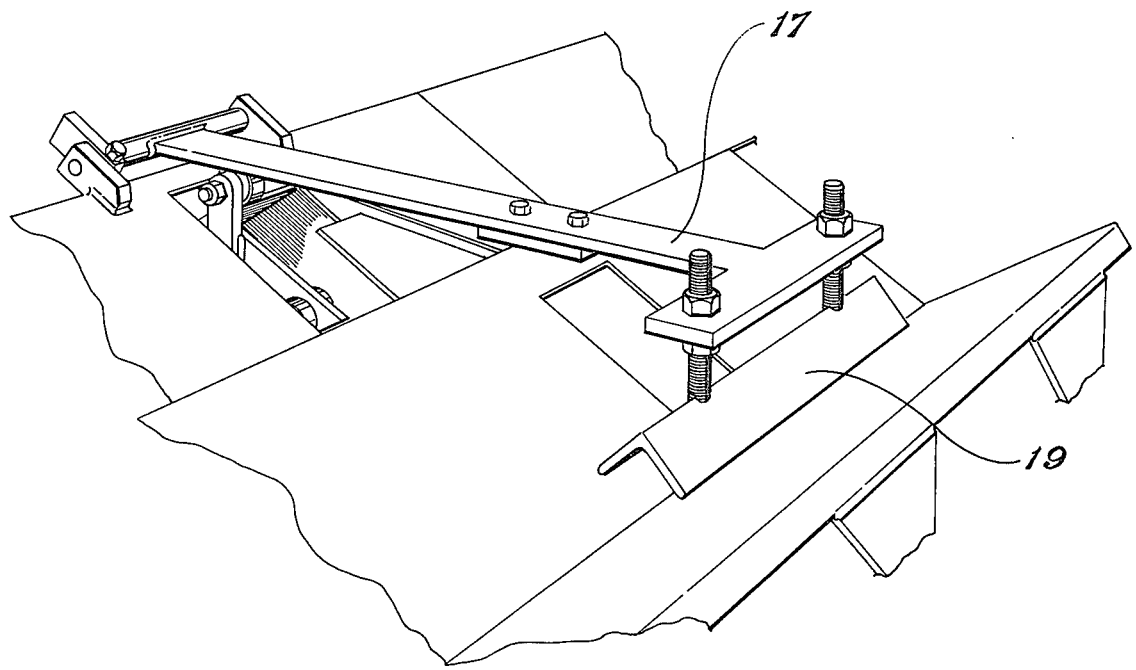
FIG. 7 is a perspective view of the pipe table with the pipe retaining angle lowered.
Figure 8:
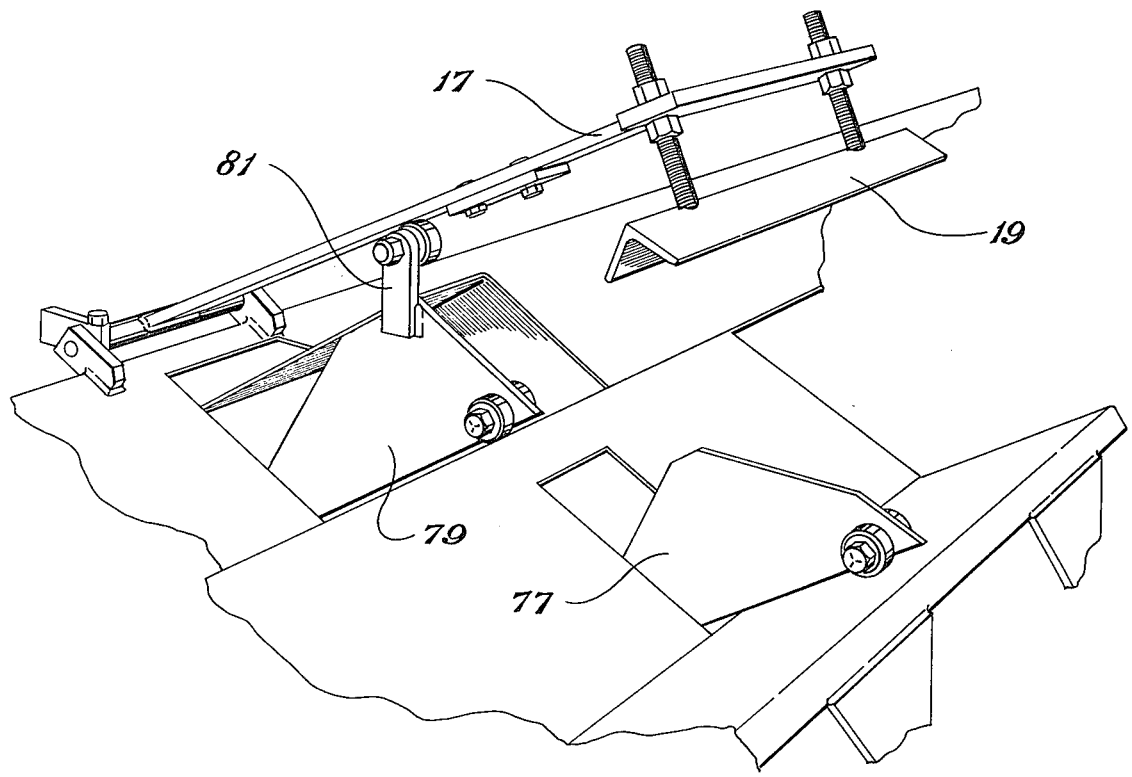
FIG. 8 is a perspective view of the pipe table with the pipe retaining angle raised.

FIGS. 7 and 8 show in greater detail how the transfer arms 17 operate to move pipe from the transfer trough to the dump trough. FIG. 7 shows the transfer arm 17 lowered, with retaining angle 19 in position for holding a pipe in the dump trough. FIG. 8 shows the transfer arm 17 raised with a transfer blade 77 moved upward to push a belled pipe out of the dump trough and a transfer blade 79 moved up to push a new pipe from the transfer trough into the dump trough. A roller 81 attached to transfer blade 79 raises and lowers transfer arm 17 as blade 79 is raised and lowered.

Referring to FIGS. 9 and 10 the operation of the transfer arms and blades will be described further. A pneumatic cylinder 83 is attached to a bell crank, or lever, arm 85 which moves blade 79 up and down. To signal when the cylinder 83 fully extends, an activator 87 on arm 85 encounters a limit switch 89. Blades 77 and 79 are connected by a turnbuckle 91 so that all of the transfer arms and blades move together. When the transfer blades return to their lowered positions a limit switch 93 is activated. Springs 95 help to urge the transfer blades upward to compensate for their weight.

Figure 11:
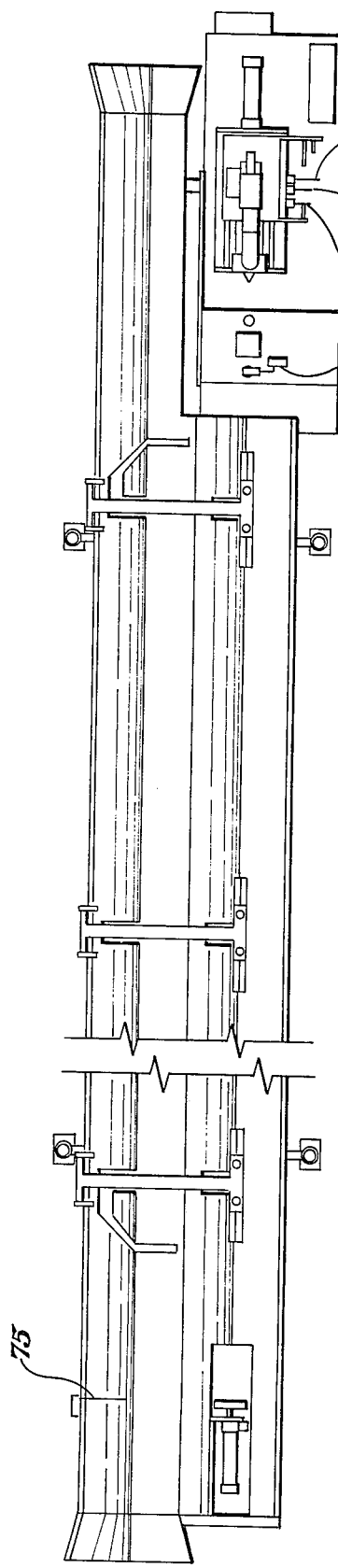
FIG. 11 is a top view schematic of the apparatus showing the location of the limit switches.
Figure 12:
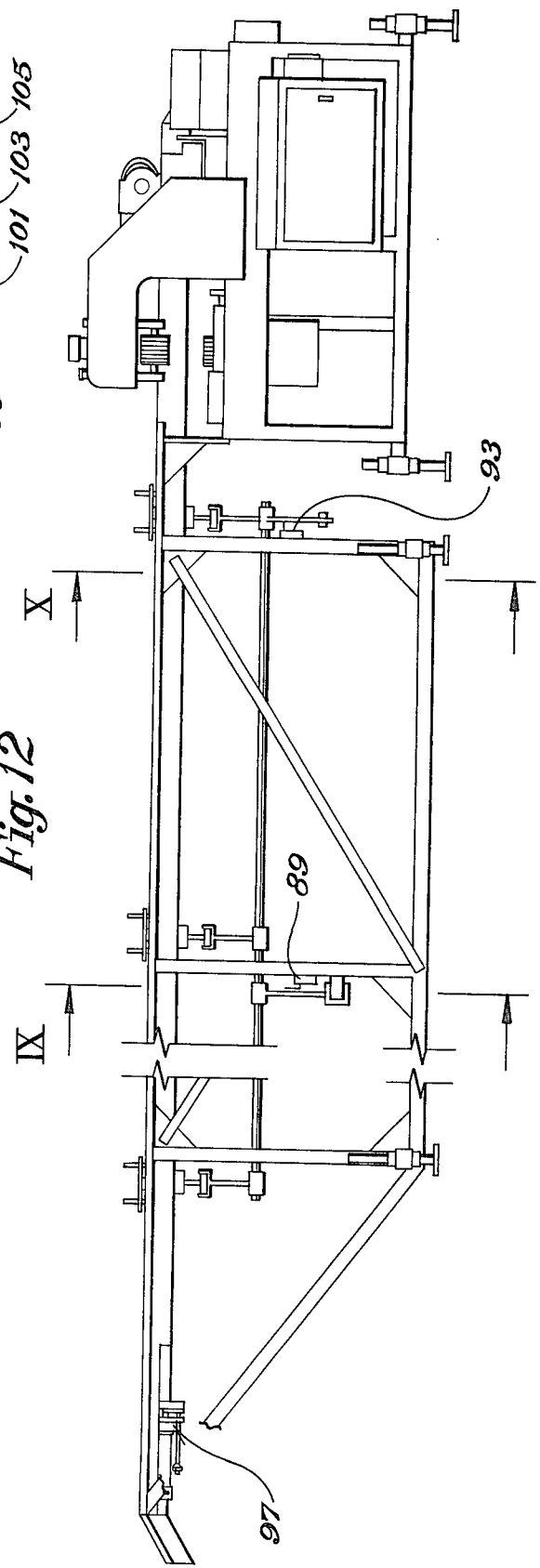
FIG. 12 is a side view schematic of the apparatus showing the location of the limit switches.

FIGS. 11 and 12 are top and side schematic views of the transfer section and the beller section showing the positioning of the limit switches. These limit switches are connected to electronically operate hydraulic valves for automatically performing the pipe movement and belling process. As stated before, switch 75 is operated by a new pipe moving into position up the transfer trough. Switch 89 is operated by the lever arm which raises the transfer blades as the blades reach the end of their upward travel. Switch 93 is operated by a lever arm as the transfer blades reach the lower end of their travel. Switch 97 is operated by the positioning plate when the pipe has been positioned for belling. Switch 99 is operated by the clamping roller.

Switch 101 is operated by the carriage which holds the heat gun as the heat gun returns to its home position. Switch 103 is also operated by the carriage approximately one half inch before the carriage moves to its most forward position. Switch 105 is operated by the carriage when the carriage reaches its most forward position.

Figure 13:
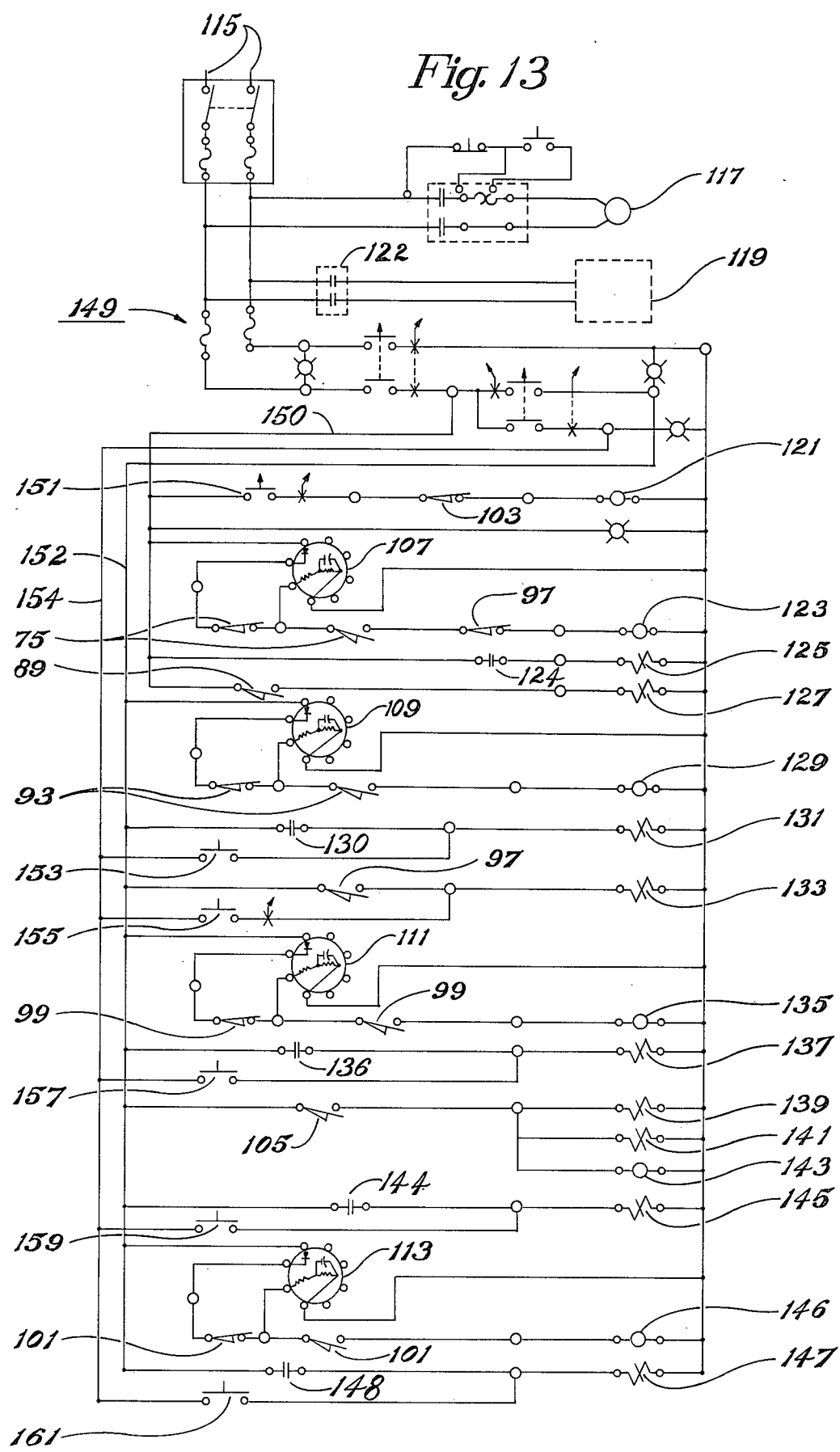
FIG. 13 is a schematic of the electronics of the present invention.

FIG. 13 is a schematic of the electronics for automatically operating the pipe transfer and belling. Switches 75, 89, 97, 99, 101, 103, and 105, described before, are shown in this schematic. Pulse generators 107, 109, 111, and 113 operate such that, when current is supplied to them, a pulse of current is generated therefrom. This allows a one time activation of a device rather than requiring a circuit for turning the device on and then another to turn it off. Pulse generators such as these are well known. Terminals 115 are connected to a power outlet having appropriate voltage. A motor 117 to turn the mandrel and rollers and operate the pneumatic cylinders is connected to receive power from terminals 115. The heating elements 119 of the heat gun 27 are also connected to terminals 115. Lamps used to indicate what is activated, safety switches, fuses, and other incidental elements shown in the drawing will not all be separately identified.

The right lead of terminal 115 is connected to elements 121, 123, 125, 127, 129, 131, 133, 135, 137, 139, 141, 143, 145, 146 and 147. The left lead is connected, after passing through a series of fuses and power control switches 149, to three leads 150, 152 and 154. Limit Switch 103 is connected on one side to lead 150 and on the other to relay 121. Relay 121 operates its corresponding switch 122 located on the lines leading to the heating elements 119. A manually operable switch 151 is located on the connection between switch 103 and lead 150. Pulse generator 107 is connected between line 150 and the right lead line of terminal 115. Limit switch 75 comprises two switches, both connected to pulse generator 107 such that when switch 75 is activated one of its switches is opened which sends a pulse through the other switch which is closed. The switch of switch 75 through which the pulse is sent is connected to a first switch of limit switch 97 which is further connected to relay 123. Relay 123 activates its corresponding switch 124 which is connected across a line from line 150 to valve switch 125. Limit Switch 89 is connected between line 150 and valve switch 127.

Pulse generator 109 is connected between line 152 and the right lead of terminal 115. Limit switch 93 comprises two switches arranged with respect to pulse generator 109 as switch 75 is to pulse generator 107. The pulsed switch of switch 93 is connected to relay 129 which activates its corresponding switch 130. Switch 130 is connected between line 152 and valve switch 131. A manually operable switch 153 is connected between line 154 and the connection between switch 130 and valve switch 131.

A second switch of limit switch 97 is connected between line 152 and valve switch 133. A manually operable switch 155 is connected between line 154 and the connection between the second switch of switch 97 and valve switch 133.

Pulse generator 111 is connected between line 152 and the right lead of terminal 115. Limit switch 99 is comprised of two switches connected to pulse generator 11 as limit switch 75 is connected to pulse generator 107. The pulsed switch of switch 99 is connected to relay 135 which activates its corresponding switch 136. Switch 136 is connected between lead 152 and valve switch 137. A manually operable switch 157 is connected between line 154 and the connection between switch 136 and valve switch 137.

Limit switch 105 is connected between line 152 and valve switch 139, valve switch 141, and relay 143. Relay 143 activates its corresponding switch 144. Switch 144 is connected between line 152 and valve switch 145. A manually operable switch 159 is connected between line 154 and the connection between switch 144 and valve switch 145.

Pulse generator 113 is connected between line 152 and the right lead of terminal 115. Limit switch 101 is comprised of two switches connected to pulse generator 113 as limit switch 74 is connected to pulse generator 107. The pulsed switch of switch 101 is connected to relay 146 which activates its corresponding switch 148. Switch 148 is connected between lead 152 and valve switch 147. A manually operable switch 161 is connected between line 154 and the connection between switch 148 and valve switch 147.

In operation, transfer of pipes and belling occur in the following manner. When a pipe moving down transfer trough 21 encounters limit switch 75, valve switch 125 is pulsed which operates pneumatic cylinder 83. This moves the pipe in the transfer trough 21 into the dump trough 23, and the pipe in the dump trough 23 onto a belled pipe receiver (not shown). When pneumatic cylinder 83 reaches the end of its travel, limit switch 89 is activated. This switch activates valve switch 127 which causes the arm of pneumatic cylinder 83 to retract. Pipe transfer arms 17 are lowered onto the new pipe in dump trough 23. The return of cylinder 83 activates limit switch 93. This pulses valve switch 131 which operates the positioning plate pusher cylinder 71, moving the new pipe into position for belling. As the new pipe reaches its position for belling, limit switch 97 is activated. Limit switch 97 prevents valve switch 125 from being activated and also activates valve switch 133. Valve switch 133 activates a pneumatic cylinder which lowers the clamping roller 43. This holds the pipe from belling and turns it at the proper speed. As the clamping occurs limit switch 99 is activated. The belling process is now ready to begin.

When limit switch 99 is activated, the pipe and mandrel 37 are in the position shown in FIG. 3. Limit switch 99 pulses valve switch 137 which moves the carriage forward. As the carriage moves forward the conical frustum of the mandrel contacts the end of the pipe and prevents mandrel 37 from moving further. The carriage, however, continues to move which causes springs, which connect the mandrel and carriage, to be stretched. This causes a force, urging the mandrel further, to be exerted on the pipe. The magnitude of this force depends on how far the springs are stretched which depends on how far the carriage moves after the pipe is encountered by the conical frustum of mandrel 37. This is controlled through the cylinder which moves the carriage forward.

The mandrel is preheated to the desired temperature before being inserted. After the pipe is heated to a temperature allowing the mandrel to bell the pipe, the mandrel begins to move forward. Approximately one-half inch before reaching the end of its travel, limit switch 103 is activated which turns off heat gun 119. At the end of its travel, limit switch 105 is activated which operates valve switches 139 and 141. These activate cooling water and cooling air for cooling the belled pipe. Limit switch 105 also operates a time delayed relay which activates valve switch 145. Valve switch 145 begins the return of carriage 55 to its home position. The time delay activation of switch 145 is sufficient to ensure complete cooling of the belled pipe prior to withdrawal of mandrel 37.

As the carriage returns, it releases limit switch 103 such that the heat gun starts preheating the mandrel for the next belling operation. A time delay relay can be inserted in the heat gun circuit to prevent overheating of the mandrel.

When carriage 55 reaches its home position, limit switch 101 is activated. This pulses valve switch 147 which causes positioning plate 15 to be returned to its home position. This in turn releases limit switch 97 which causes clamping roller 43 to be raised and the next pipe to move up transfer through 21. The cycle is then repeated.

It should be clear from the description that a pipe belling method and apparatus having significant advantages has been provided. The foregoing disclosure and the showings made in the drawings are merely illustrative of the principles of this invention and are not to be interpreted in a limiting sense.

What is claimed is:

1. An apparatus for belling a plastic pipe comprising:
   a. a mandrel;
   b. means for heating the mandrel;
   c. means for urging the mandrel into the pipe with a predetermined force simultaneously with heating such that the mandrel will move into the pipe and form a bell only after the pipe is heated to a predetermined temperature between its memory temperature and its damage temperature,
   d. means for heating the pipe simultaneously as it is applied to the mandrel;
   e. means for stopping the heating of the pipe responsive to movement of the mandrel;
   said mandrel being of a predetermined size and shape for the plastic pipe and being shaped to resist movement of the mandrel into the pipe to effect a bell end until the pipe is heated to a predetermined belling temperature between its memory temperature and its damage temperature such that said pipe must be heated to said predetermined belling temperature before the predetermined force will move the pipe onto the mandrel and the bell is always formed at the correct predetermined belling temperature;
   f. means for cooling the pipe; and
   g. means for removing the pipe from the mandrel.

2. The apparatus of claim 1 which further comprises means to perform movement of the pipe onto and off of the mandrel automatically.

3. An apparatus for belling a plastic pipe comprising:
   a. a mandrel;
   b. means for heating the mandrel;
   c. means for urging the mandrel into the pipe with a predetermined force simultaneously with heating of the pipe such that said mandrel will move into the pipe and form a bell only after the pipe has been heated to a predetermined temperature between its memory temperature and its damage temperature to form a bell at the correct predetermined belling temperature;
   d. means for heating the pipe simultaneously as the mandrel is urged into the pipe;
   e. means for stopping the heating of the pipe responsive to movement of the mandrel;
   f. the mandrel being of a predetermined size and shape for the plastic pipe and being shaped to resist movement of the mandrel into the pipe sufficiently to effect a bell end until the pipe is heated to a predetermined belling temperature between its memory temperature and its damage temperature such that said pipe must be heated to said predetermined belling temperature before the predetermined force will move the pipe onto the mandrel and the bell is always formed at the correct predetermined belling temperature;
   g. means for cooling the pipe;
   h. means for removing the pipe from the mandrel;
   i. means for moving the pipe into and out of position for belling; and
   j. means for automatically performing the pipe movement and belling processes.

4. The apparatus of claim 3 wherein said means for heating the mandrel and said means for heating the pipe comprises heated air blown into an oven that is movable longitudinally of the mandrel and pipe and said heated air is not only stopped responsive to movement of said mandrel to stop heating of the pipe but is also started responsive to movement of the mandrel to start heating the mandrel once it is backed out of the belled end and before the mandrel is urged into a new pipe end.

5. The apparatus of claim 3 wherein said means for urging the mandrel into the pipe with a predetermined force comprises respective rotating means for rotating said mandrel in said pipe at a first rotational speed and a fluidically powered cylinder urging said mandrel longitudinally of said pipe.

6. The apparatus of claim 5 wherein said means for urging the mandrel into the pipe with the predetermined force includes a plurality of roller means, including idler and clamping rollers for simultaneously rotating said pipe at the first rotational speed and holding said pipe against longitudinal movement.

7. The apparatus of claim 3 wherein said means for cooling the pipe comprises fluid spray jets for spraying a cooling fluid onto the exterior of said pipe.

8. The apparatus of claim 7 wherein said means for heating the pipe and means for heating the mandrel comprises heated air blown into an oven; said oven has a plurality of apertures for blowing therethrough a cooling fluid; and said fluid spray jets of claim 5 are disposed so as to blow said cooling fluid through said apertures when said oven is at the cooling position.

* * * * *